(12) United States Patent
Warhuus et al.

(10) Patent No.: US 9,953,325 B2
(45) Date of Patent: Apr. 24, 2018

(54) METHOD, SYSTEM AND DEVICE FOR E-COMMERCE PAYMENT INTELLIGENT ACCESS CONTROL

(71) Applicant: CYPOD TECHNOLOGY AS, Horten (NO)

(72) Inventors: Christian Warhuus, Horten (NO); Bjorn Elias Hesthamar, Gothenburg (WO)

(73) Assignee: CYPOD TECHNOLOGY AS, Horten (NO)

( * ) Notice: Subject to any disclaimer, the term of this patent is extended or adjusted under 35 U.S.C. 154(b) by 388 days.

(21) Appl. No.: 14/418,686

(22) PCT Filed: Aug. 2, 2013

(86) PCT No.: PCT/NO2013/000042
§ 371 (c)(1),
(2) Date: Jan. 30, 2015

(87) PCT Pub. No.: WO2014/021720
PCT Pub. Date: Feb. 6, 2014

(65) Prior Publication Data
US 2015/0269576 A1 Sep. 24, 2015

(30) Foreign Application Priority Data
Aug. 2, 2012 (NO) .................................. 20120867

(51) Int. Cl.
*G06K 5/00* (2006.01)
*G06Q 20/40* (2012.01)
(Continued)

(52) U.S. Cl.
CPC ......... *G06Q 20/409* (2013.01); *G06Q 20/085* (2013.01); *G06Q 20/3226* (2013.01);
(Continued)

(58) Field of Classification Search
CPC ..... G06F 21/31; G06F 21/33; G06Q 20/4012; G06Q 20/085; G06Q 20/1085;
(Continued)

(56) References Cited

U.S. PATENT DOCUMENTS 6,985,583 B1 * 1/2006 Brainard ................. G06F 21/31
380/277
7,149,895 B1 12/2006 Asokan et al.
(Continued)

FOREIGN PATENT DOCUMENTS

| EP | 1026641 A1 | 8/2000 |
|----|------------|--------|
| JP | 2000231661 A | 8/2000 |

(Continued)

OTHER PUBLICATIONS

User guide Handelsbankern's card reader, Feb. 2012.
(Continued)

*Primary Examiner* — Thien M Le
(74) *Attorney, Agent, or Firm* — Young & Thompson

(57) ABSTRACT

A method, system and device for authenticating a user of a smartcard in an authentication process providing a secure environment including a smartcard and the device connected to a host computer for user identification.

14 Claims, 13 Drawing Sheets

(51) Int. Cl.
*G06Q 20/34* (2012.01)
*G06Q 20/08* (2012.01)
*G06Q 20/32* (2012.01)

(52) U.S. Cl.
CPC .......... *G06Q 20/34* (2013.01); *G06Q 20/353* (2013.01); *G06Q 20/40* (2013.01); *G06Q 20/4012* (2013.01)

(58) Field of Classification Search
CPC .......... G06Q 20/3223; G06Q 20/3226; G06Q 20/34; G06Q 20/40; G06Q 20/409; G06Q 30/0239
USPC .......................................... 235/380, 379, 375
See application file for complete search history.

(56) References Cited

U.S. PATENT DOCUMENTS

| | | | | |
|---|---|---|---|---|
| 7,242,766 | B1* | 7/2007 | Lyle | .......... H04L 9/12 380/2 |
| 2002/0147653 | A1 | 10/2002 | Shmueli et al. | |
| 2004/0117632 | A1* | 6/2004 | Arling | .......... H04L 9/12 713/182 |
| 2010/0074438 | A1* | 3/2010 | Wang | .......... H04L 9/0836 380/44 |
| 2010/0131764 | A1* | 5/2010 | Goh | .......... H04L 63/0464 713/171 |
| 2011/0246770 | A1 | 10/2011 | Badra et al. | |
| 2012/0095919 | A1 | 4/2012 | Hart et al. | |
| 2012/0210127 | A1* | 8/2012 | Kameda | .......... G06F 21/31 713/168 |
| 2014/0325678 | A1* | 10/2014 | Kotla | .......... G06F 21/62 726/28 |
| 2016/0050199 | A1* | 2/2016 | Ganesan | .......... G06F 21/31 726/7 |

FOREIGN PATENT DOCUMENTS

| | | |
|---|---|---|
| JP | 200840908 A | 2/2008 |
| WO | 0160013 A1 | 8/2001 |
| WO | 2001060013 A1 | 8/2001 |
| WO | 0205481 A1 | 1/2002 |
| WO | 2002005481 A1 | 1/2002 |

OTHER PUBLICATIONS

International Search Report, dated Feb. 19, 2014, from corresponding PCT application.
Supplementary European Search Report dated Mar. 8, 2016; Application No. EP 13 82 5813.
Jun. 9, 2017, Russian communication issued for related Russian application No. 2015107243/08.
Sep. 25, 2017, JP communication issued for related JP application No. 2015-525397.

* cited by examiner

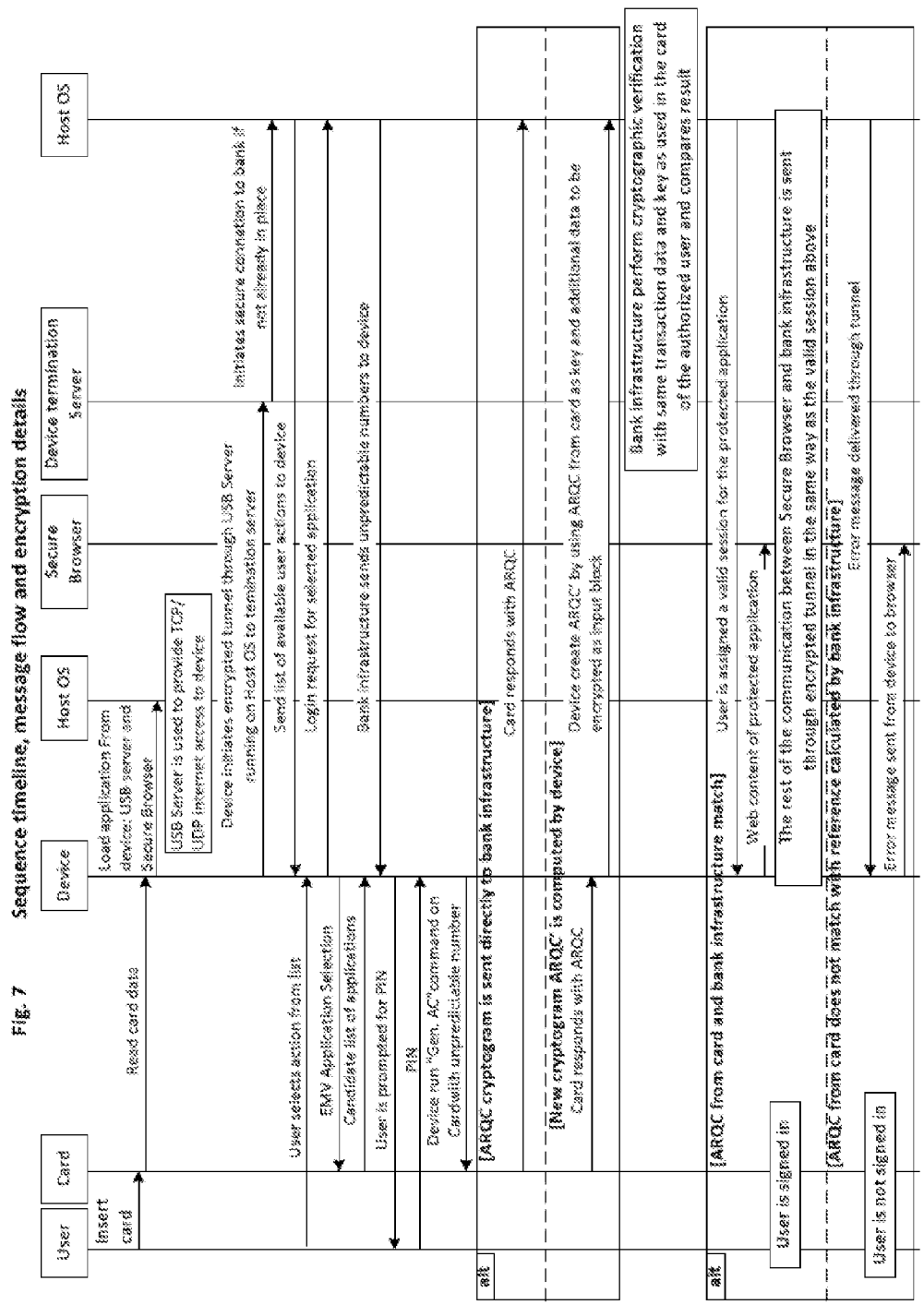

METHOD, SYSTEM AND DEVICE FOR E-COMMERCE PAYMENT INTELLIGENT ACCESS CONTROL

FIELD

The invention relates to a method, system and device for validation of a transaction process comprising secure client-side two-factor authentication used in e.g. payments and online banking sessions.

BACKGROUND

The use of computers and mobile phones are common in today's online banking and commerce environment, where the concept of online banking and commercial transactions refers to self-service transactions conducted in proximity with a POS terminal or other terminal, or remotely via a web browser or similar.

In the field of online banking the concept comprises self-service banking conducted on any internet-enabled device, e.g. a laptop computer or a mobile device. Online banking, irrespective of type of device used, can be accessed via different channels, e.g. web browser, app or SMS.

E-commerce payment solutions are also comprised in the same field of technology, being defined as a card transaction or credit transfer made in an e-commerce context. E.g. a payment card is used to pay for goods from an online merchant.

The various solutions in online banking and payment applications offer a variety of authentication mechanisms in an attempt to increase the security of information exchange. One such is the use of a hardware token, which in short is a device such as a key fob, token, or authentication module with a known secret that is issued to a user and is identifiable by a bank. Such a hardware token will generate a onetime password (OTP) and use this combined with additional credentials to initiate a session or action at an escalated security level for the protected application. Although this is easy to use and the simpler versions without connectivity can be used for mobile applications, there are serious vulnerabilities related to e.g. password sniffers and session hijacking attacks from third party software running on the client. Other weaknesses are differences in connectivity between different devices and constraints regarding driver software.

A secure browser is an additional security measure. A secure browser may be accessible through a USB Mass Storage device. Such unit does not need to be installed on the computer, and may be working with several different Operating Systems. The security is enhanced in that it is separated from the host computer, but is likely to be vulnerable as the computer may be compromised, which in turn compromises the browser session as well. The disadvantage is that once the application is started it offers only the same security level as the installed software.

Some bank solutions rely on the issuance of static passwords to grant access to the online bank. The password can be issued by the bank, a user selected password based on e.g. social security number, or data printed on a payment card issued by the bank. This has the advantage that it is simple to use, but provides no real security layer and is very vulnerable to a man-in-the-middle attack.

Also the use of a pre-issued code sheet is frequently used by bank applications. This is used as a collective term for a printed sheet with codes that is sent to the customer to use when accessing the bank applications. Although easy to use and cheap to produce, this solution creates more abuse and confusion compared to hardware tokens and OTP generators. The security level is considered to be low, since no guarantee is provided to avoid misuse and copying of the code sheets.

In mobile terminals a software token may be adapted. This functions in the same manner as a hardware token, generating one-time passwords. The advantage is no need for extra hardware, but the downside is that it suffers the same weakness as a PC in regards to having the same security problems. Keystrokes can be monitored, software altered or sessions can be relayed to a third party.

In e-commerce payment applications, a conventional method is to enter payment card data while performing an online checkout by simply reading and typing the numbers printed on the face of the card, including card account number, expiry date and sometimes a card security code e.g. the CVV code. The merchant can use a gateway to transmit these data. Even if this is a very easy method to use, it offers little security since no additional authentication is required, and a user only needs access to the information printed on the card to approve the payment. This is referred to as Card Not Present (CNP) transactions. CNP transactions currently account for the majority of card fraud.

Other e-commerce payment applications rely on the use of stored payment card data where the user is redirected to a secure login when performing checkout. Normally a username and a password are required to continue with the transaction, and in some instances a hardware token may be required. The service provider is entrusted the keeping of the payment card information on the user's behalf. With a hardware token, the convenience is reduced drastically and faulty input very often initiates a denial of service.

AIM OF THE INVENTION

The present invention is directed towards the above discussed problems, where a method and a device is provided to solve the problems related to giving away personal data such as account numbers and passwords to devices and host computers that are not trusted, and to provide a trusted environment that enable secure payment and information handling related to purchases and other related applications.

A system for implementing the method is provided.

The present invention is intended to solve a number of issues raised as problem areas related to online banking, e-commerce payment and card acceptance.

BRIEF DESCRIPTION OF THE FIGURES

FIG. 7 is a sequential timeline, message flow and encryption details of the process to protect communication between the device, untrusted host computer, termination point and application resource (bank infrastructure). Exemplified in the form of a login action.

DETAILED DESCRIPTION OF THE INVENTION

Figure 1:
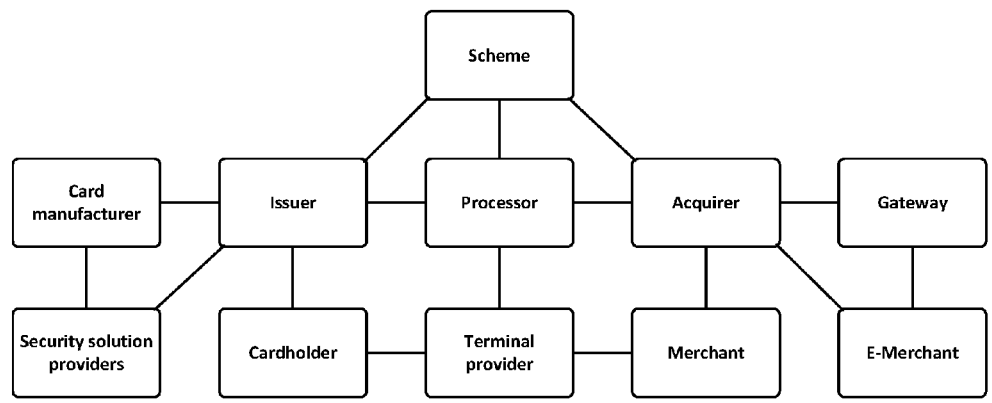
FIG. 1 illustrates the complex network of interdependent parties and service providers in the payment industry.

It shall be understood that the present invention and its components are merely illustrated as examples of embodiments in the figures and embodiment descriptions herein, and may be designed in many variations and configurations. The figures and embodiments are not intended to limit the scope of protection of the invention as claimed, but represent merely selected embodiments of the invention.

The invention can be adapted to be used in a number of different configurations, and as the following describe specific embodiments utilizing one of possible applications, or a combination of such applications, it shall be understood that any combination of any number of applications can be adapted to be hosted by the invention.

When the phrase "the invention" is used in this document it shall be understood that the phrase points to the invention comprising a variety of the discussed features, also if not all features are implemented in the specific embodiment in question.

When the phrase host computer is used in this document it shall cover any device that can be used as a host for a network connection between the invention device and the bank infrastructure, e.g. PC, tablet, smartphone, custom devices with network connections and others.

When the phrase bank infrastructure is used in this document it shall cover server or service offered by a bank, payment card issuer, owner of loyalty card program or any 3.rd party operator of such or other, that will handle the authentication of the users of the services enabled by the invention and the exchange of information between the parties using or offering services that are enabled by the invention.

The words card, payment card, smartcard and contactless card is used in this document to define chip based cards or smartcards used by banks, credit card companies, and other such as loyalty programs issued to users/members, in order to authenticate and the user and define the services that the individual users are entitled.

The invention is a hardware device comprising a Microcontroller 100 with a number of embedded features, a Human Interface Device (HID) unit comprising keypad 210 in any form such as keys and/or touch screen based keyboard, and optionally feedback output device(s) 220 such as an e-ink display and/or a traditional display. Further the device comprise peripheral connected input devices 240, 241, 242, one or more storage units 250 and one or more communication ports 260. Further the invention comprise a Power Management Unit 300 comprising optionally a Real Time Clock 310, a battery 320 and a battery charging unit 330. The charging unit 330 may be powered through an input line connectable to one of the communication ports 260.

Figure 2:
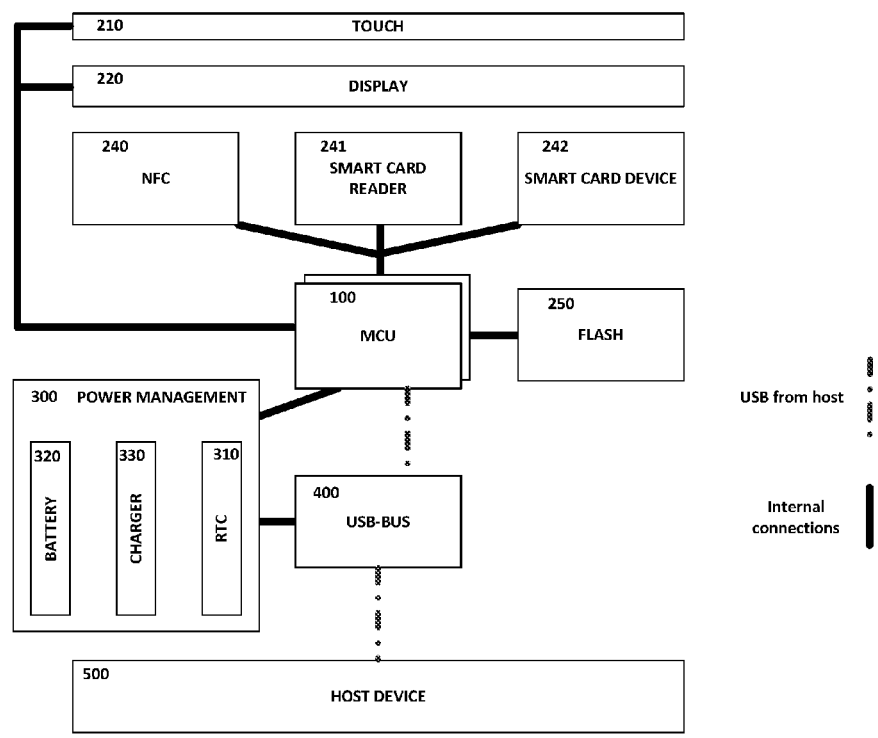
FIG. 2 is a block diagram showing an overall architecture of an intelligent authentication token according to the invention.

The different components of the invention is shown in FIG. 2 where the Microcontroller 100 is connected via a communication bus to the input device units exemplified in this figure by one or more of the Near Field Communication (NFC) Unit 240, the EMV reader unit 241, and an optional embedded Smartcard device 242. The Microcontroller is further connected to a touch screen 210 for input and a digital display 220 for output of information. The Microcontroller 100 is connected to the Power Management Unit 300.

A flash memory module 250 is optionally connected to the Microcontroller 100 via a communication bus.

A USB bus 400 connects to the Microcontroller 100, the power management and the Host Device or host computer.

The optional Flash memory 250 is connected to the MCU which handles encryption, access control and management of the storage.

Figure 3:
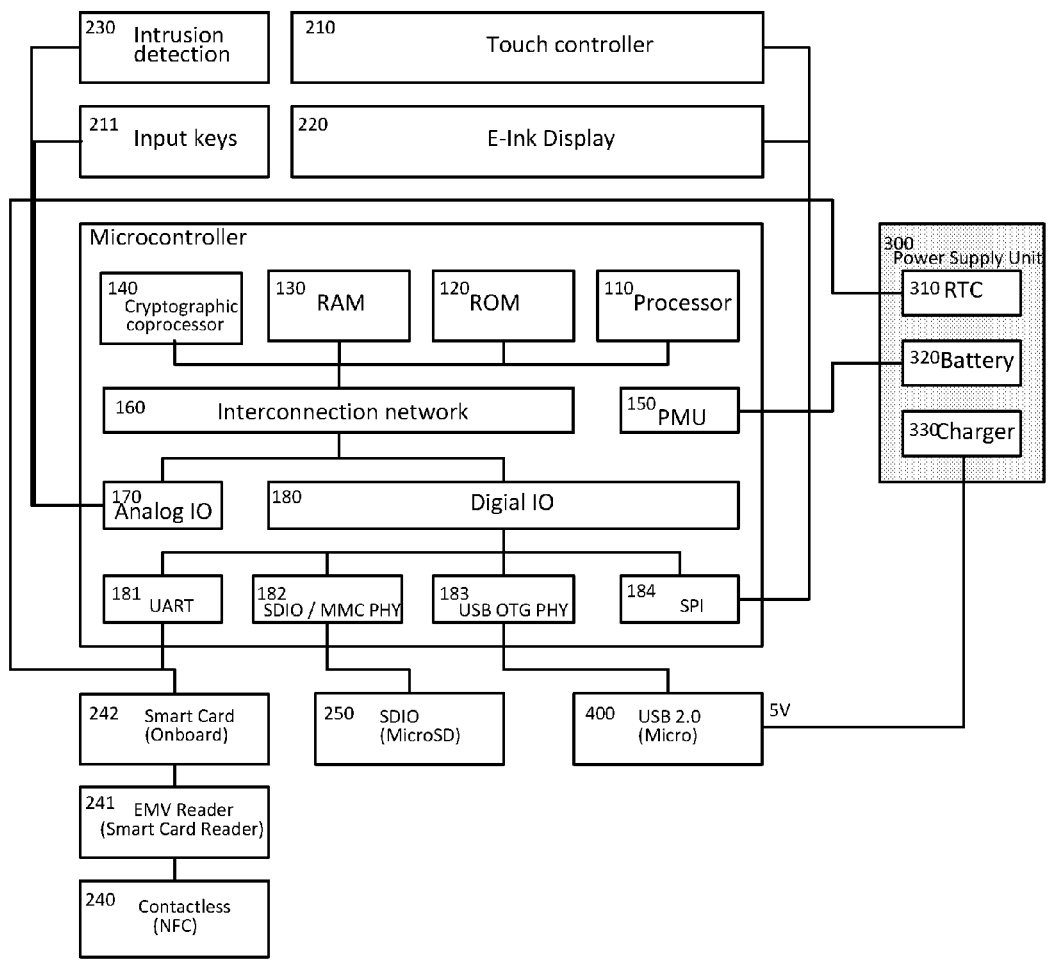
FIG. 3 is a detailed block diagram of the different components of an intelligent authentication token according to the invention.

Now looking at the detailed content of the Intelligent Authentication Token as shown in FIG. 3 the Microcontroller 100 comprises a processor 110, a ROM 120, a RAM 130 and a Cryptographic processor 140. An interconnection network 160 function connects these four modules. The interconnection network 160 is further connected to a Digital I/O 180 module, and secondly to an Analog I/O 170 module. The Digital I/O 180 module is connected to a number of optional output ports, being one or more of an UART (Universal Asynchronous Receiver/Transmitter) 181, SDIO (Secured Digital I/O) 182, USB (Universal Serial Bus) 183 and SPI (Serial Peripheral Interface) 184. FIG. 3 also shows a more granular view of the input device by showing a separate input for keys, an Input keys 211 module, which is connected directly to the Analog I/O port 170 in the Microcontroller 100. This figure also show an Intrusion detection 230 module connected to the same Analog I/O port 170.

Embodiments of the invention may include all or more than one of any of the modules shown in the figures. Some embodiments may also omit any number of modules in alternative versions of the invention, and may also, when appropriate, connect to third party devices solving omitted features.

The following description makes use of the phrase bank infrastructure Bank infrastructure is used to identify either the bank where the card account resides, or the Acquirer which process the transaction and completes the financial settlement between the issuing bank and the merchant bank.

Figure 4:
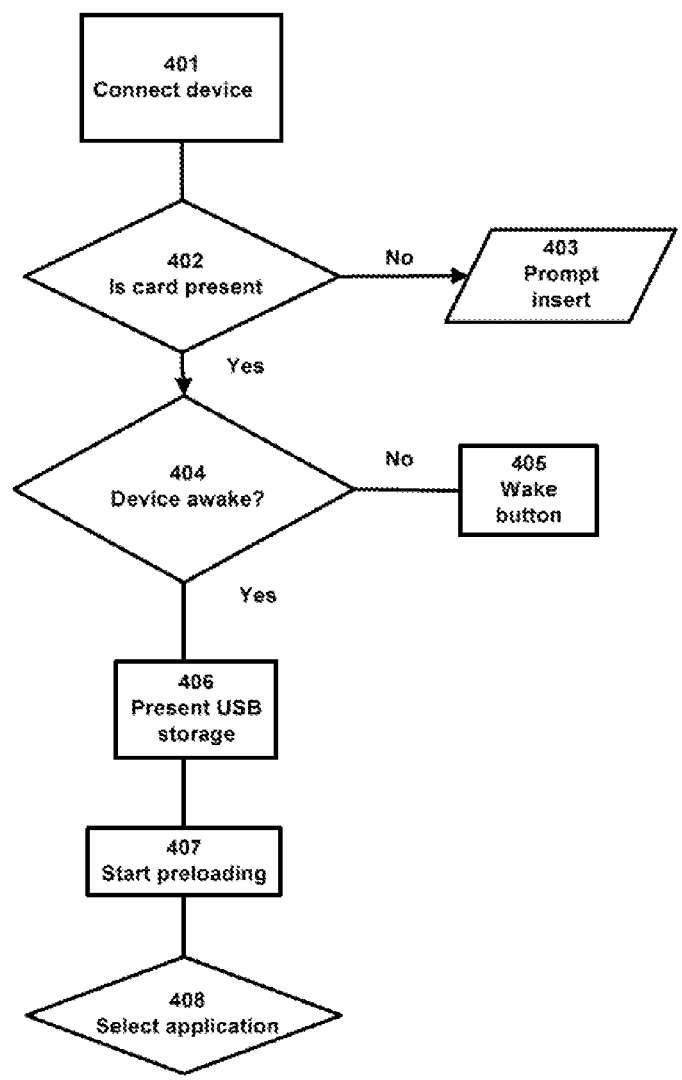
FIG. 4 is a flow diagram of a typical application selection process of the invention.

A typical session selecting an application by an embodiment of device of the invention is shown in FIG. 4. The user connects the device 401 to a supported host computer either by cable or via a contactless connection. If the device is asleep or shut down, it will be awakened or turned on by connecting the device to a host.

The user is prompted for inserting a supported payment card 403 if the device has not register a card already present 402 in one of the card readers 242,241 or/and 240 of the device. If the device falls asleep after timer has expired for sleep mode, the device is awakened when a card is inserted in the card slot 241, 240 or when an awake-button is activated 405.

Once the device is connected to the host device/computer, and payment card is registered present in the card reader device 242,241 or 240, the device presents a USB storage interface that lets the Host Device/computer launch a native application 408.

Figure 5:
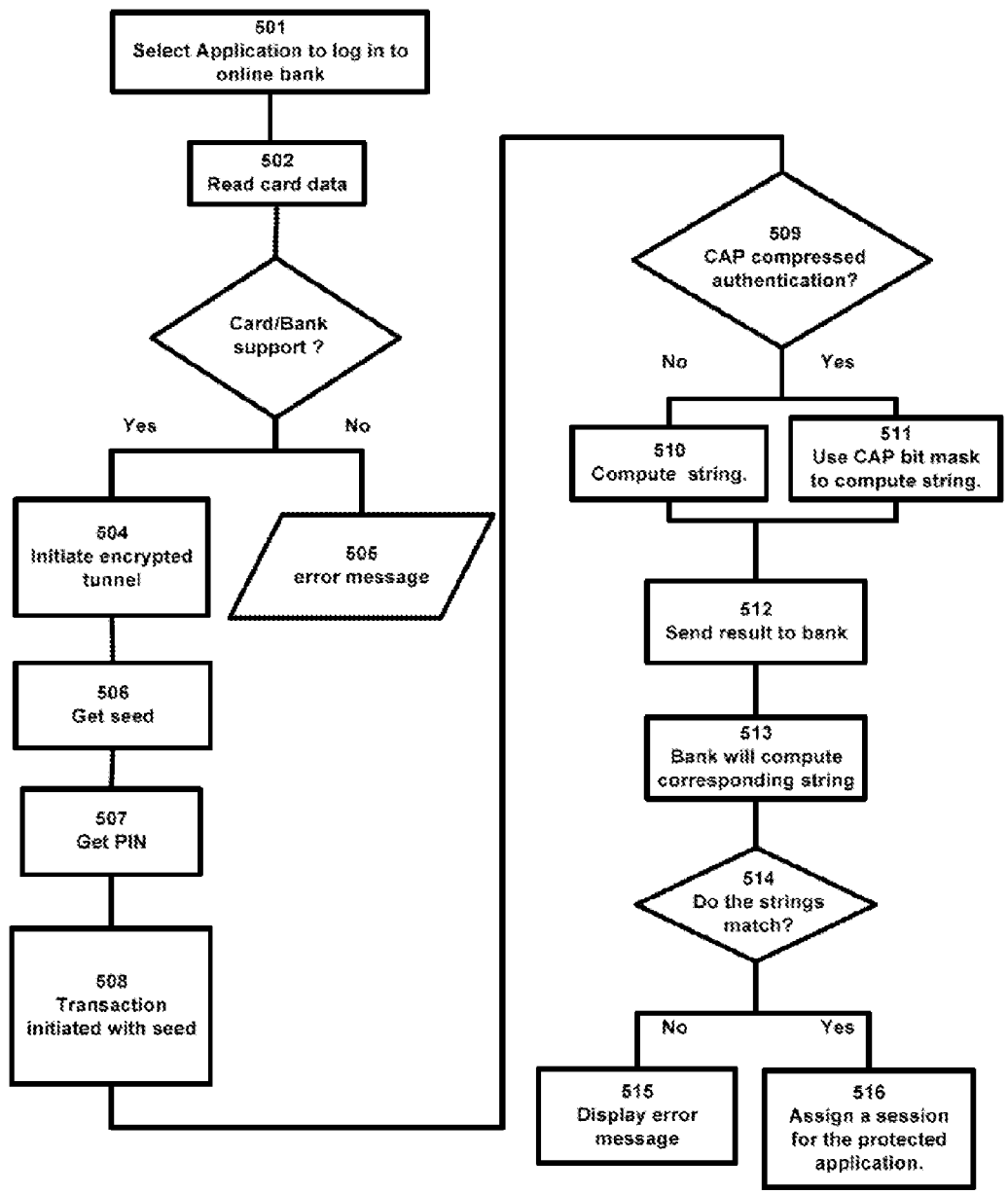
FIG. 5 is a typical login process of the invention.

Once the application 408 is loaded and runs on the host the user is able to select actions 409 from a menu presented on the host and/or the device. The user may select to login 501 to the bank infrastructure. The login process is described in detail in FIG. 5.

When the user selects to login to the bank services 501 the device reads 502 card data and identification parameters defining the specific bank that is usually the card issuer, and other metadata such as language preferences.

The device checks if card and/or bank is supported by the device 503. If the bank or card is not supported an error message is displayed 505. If card and/or bank is supported, an encrypted secure communication channel, an encrypted tunnel, between the device and the identified bank is initiated and set up 504 by the device. The host network connection is used to facilitate this, e.g. internet connection.

When the encrypted tunnel is set up, the Hardware Security Module (HSM) of the bank infrastructure system generates an unpredictable number, a salt; and this is then sent 506 to the device.

The host displays a message instructing the user to enter a PIN code 507 to the device. This is achieved by the device offering input means, e.g. a touch screen feature offering a 10 digit panel, a key button panel or other, and the user operates this to enter a predefined PIN code identifying the correct user of the card.

The next step in authorizing the pending transactions is that the device uses the salt to perform an EMV transaction 508 according to CAP or the bank infrastructure specification. This may include card information, PIN and other device specific generated constant and variable parameters.

The communication between the device and the bank infrastructure reveals whether the bank infrastructure requires CAP compressed authentication or not 509. If CAP compressed authentication is required by the bank infrastructure, the device will use the CAP bitmask stored in the card to perform an extraction of the indicated bits and compute a resulting string 511. If CAP compressed authentication is not required, the device will simply compute the resulting string identifying the card account without any compression 510.

The resulting string identifying and authenticating the card account and the user is sent back 512 to the bank infrastructure through the encrypted tunnel.

Upon receiving the resulting string from the device, the bank infrastructure will perform a corresponding calculation 513 of the EMV/CAP transaction with the data known to the bank, and the result is then compared 514 for an identical resulting string.

If the comparison reveals different results an error state is communicated to the device and alternatively an error message is displayed to the user 515, otherwise when the strings match a session is assigned 516 for the protected selected application.

Figure 6:
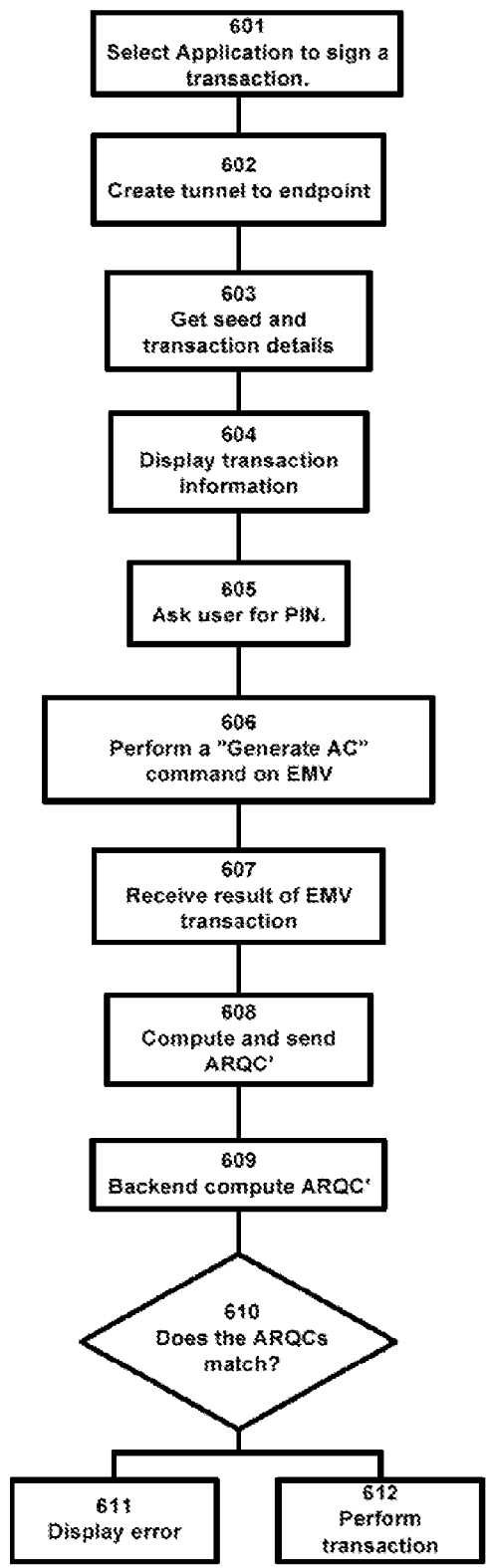
FIG. 6 is a typical transaction approval process of the invention.

FIG. 6 shows a procedure where the user wants to sign a transaction of funds requested in a host application e.g. in an online shop where a shopping basket has been brought to the payment process, or simply a bank transaction between accounts. User selects the application for signing a transaction 601. A new encrypted tunnel is initiated and created 602, comprising the sending of transaction details from the running host application, to the bank infrastructure for verification of the transaction details.

The bank infrastructure provides and communicates 603 a salt and transaction detail parameters to the device. The details of the transaction are displayed to the user 604. The user is then asked to verify the transaction by inputting 605 a PIN code, followed by the device issuing 606 a "Generate AC" command on the EMV card where the AC generation comprises the use of the salt generated by the bank infrastructure 603. The device then receives 607 an Authorization Request Cryptogram (ARQC) from the EMV.

Since the received ARQC is based only on a few EMV specific parameters the device can, to enhance security and authorization, wrap the ARQC together with additional transaction parameters, such as amount, date, originator id and other, using an encryption algorithm to generate 608 a second ARQC'.

The new ARQC' is then transmitted to the bank infrastructure where a corresponding generation 609 of an ARQC' is performed. The bank infrastructure then compares 610 the received ARQC' with the generated ARQC'.

If the comparison reveals differences, the operation failed, and an error message is transmitted to the user 611, or the user is directed to a specific information page. Otherwise the ARQC is accepted, and the transaction is executed 612 as specified.

The timeline diagram in FIG. 7 exemplifies the information flow between the user, card, e.g. an EMV card, device of the invention, the host operating system (OS), a secure browser, a device termination server and the bank infrastructure, e.g. the card issuer. The device termination server may be handled by a trusted 3.rd party, or may be included in the bank infrastructure itself. Further examples and figures will explain the different scenarios. Here the flow of information between the device and the device termination server and/or the bank infrastructure is secured by the host downloading and executing a USB server application from the device providing secure browser features. This download is facilitated once the user has presented a valid card, e.g. an EMV card from the card issuer, to the device. All communication between the device and the device termination server and/or the bank infrastructure will now be sent through the encrypted tunnel provided by the USB server application. Since the USB server application physically is running on the host, it may be an option to display and perform user interaction via the host display unit and keyboard input.

When the device termination server and/or the bank infrastructure responds to the encrypted tunnel initiation, it will also attach a list of available actions for the user/card. The device then presents all or a selection of the available actions to the user as user selectable services. The user then selects which service to use.

When the user has selected the choice of service, the device communicates this choice to the bank infrastructure, and at the same time initiates communication with the card, e.g. the EMV card by sending an application selection request.

The device termination server and/or the bank infrastructure respond to the login request by generating an unpredictable number, a salt, and sends this to the device.

The device prompt the user for a personal PIN code that when entered by user is sent to the card in a Gen AC command, the command comprises the PIN from user and the salt from device termination server and/or the bank infrastructure.

The card responds with a card generated ARQC that is transferred to the device termination server and/or the bank infrastructure by the device. The device termination server and/or the bank infrastructure will have performed the same ARCQ generation on its own end, and compares this to the received ARQC from the card. The comparison will show if the correct card and PIN was presented.

If the authorized owner is using the card (having the card and knowing the PIN), a valid session is assigned for the selected protected application, and the secure session is established. If the comparison fails, and error message is transmitted to the device, and the device may relay this to the user.

In this process several scenarios may be utilized: one is that the bank sends out a web-based form that the user fills out on the Host computer. When ready, the form is sent down to the Device. The Device presents the information filled in into the form and lets the user choose if the form should be declined or signed using the EMV-chip which might include typing in the PIN. The signed form is then sent to the bank infrastructure, which then can verify the signing. If the Host computer is infected, and the content of the form is altered, the user will be able to see that the form presented on the Device miss-matches with what the user typed in on the Host computer, and can then choose to decline signing.

The user may alternatively fill in a web based form on the device, and send it to the bank infrastructure. A form is displayed on the host computer, but the user is directed to give input to the form via the HID on the device. For every character the user enters on the device a symbol will be displayed in the corresponding field on the host computer. But the values are not set to the host computer, they are put in temporary storage on the device and when the user, through the browser, on the host computer request to submit the form, the values are added to the correct fields instead of the symbols displayed earlier. When the form is submitted it is required to be sent to the device in order to be included in the encrypted tunnel. The bank infrastructure can then contact a device termination server which again communicates with the Device. The Device will now present the form that the bank requested signing of. The user can now choose to decline or sign the form using an EMV-card and he might be prompted to enter the PIN for that card. The signed or declined form is then sent back to the bank infrastructure via the device termination server.

Alternatively, the user is presented with a web based form from the issuer. This form will after it has been filled out, be presented on the device for verification. The user can then choose to decline or sign using an EMV-card and might be prompted to enter the PIN.

The device can be used to perform authentications under the following settings:
Using the on board secure element authenticated by the device vendor partner of the device vendor.
Using a payment card connected to device, verified by the issuing bank of the payment card. Issuing bank must have knowledge about device. Normally used to authenticate against a bank.
Using a payment card connected to device, verified by the issuing bank trough the payment card scheme. Issuing bank can be any bank connected to scheme. Normally used for card payments.

Figure 8A:
FIG. 8A shows a simplified view of a system of the invention used to purchase from online retailer with credit transfer
Figure 8B:
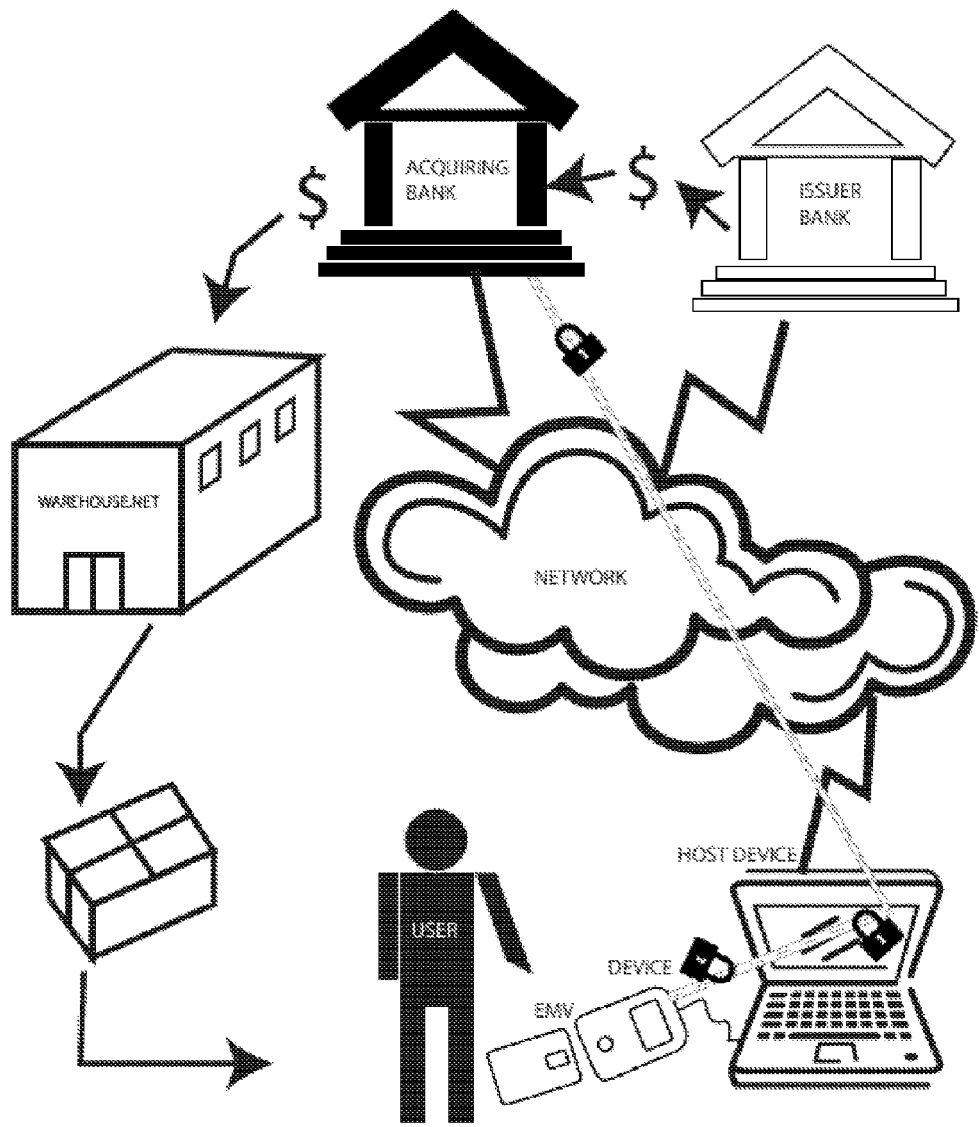
FIG. 8B shows a simplified view of a system of the invention used to purchase from online retailer with VISA transfer

FIG. 8A exemplifies the method and system of a purchase from an online retailer with credit transfer, where the user wants to purchase goods from an online retailer using a "host computer". When the user is ready for checkout he chooses to pay with his payment card issued by his bank. The connection to the bank infrastructure is initiated in the same manner as in FIG. 9 or 10 below, but with the difference that instead of signing in and starting a session on the online banking environment provided by the bank infrastructure, the user is signing a specific transaction that he wants to perform. The amount and receiver is displayed on the device and the user confirms by entering his PIN number on the device. The device can add more transaction data to the ARCQ by using it as a key and the extra data as input block for an encryption operation performed on the card. The bank infrastructure can then validate both the ARQC, the transaction data, the card and thereby authenticate the user for the given transaction as signed by the card and PIN. After the transaction is verified, a message will be sent back to the merchant (warehouse.net in the figure) and the goods will be cleared for dispatch. The user pays with a card, but does not use the payment scheme of the card. All connection is performed directly with the bank infrastructure.

Figure 9:
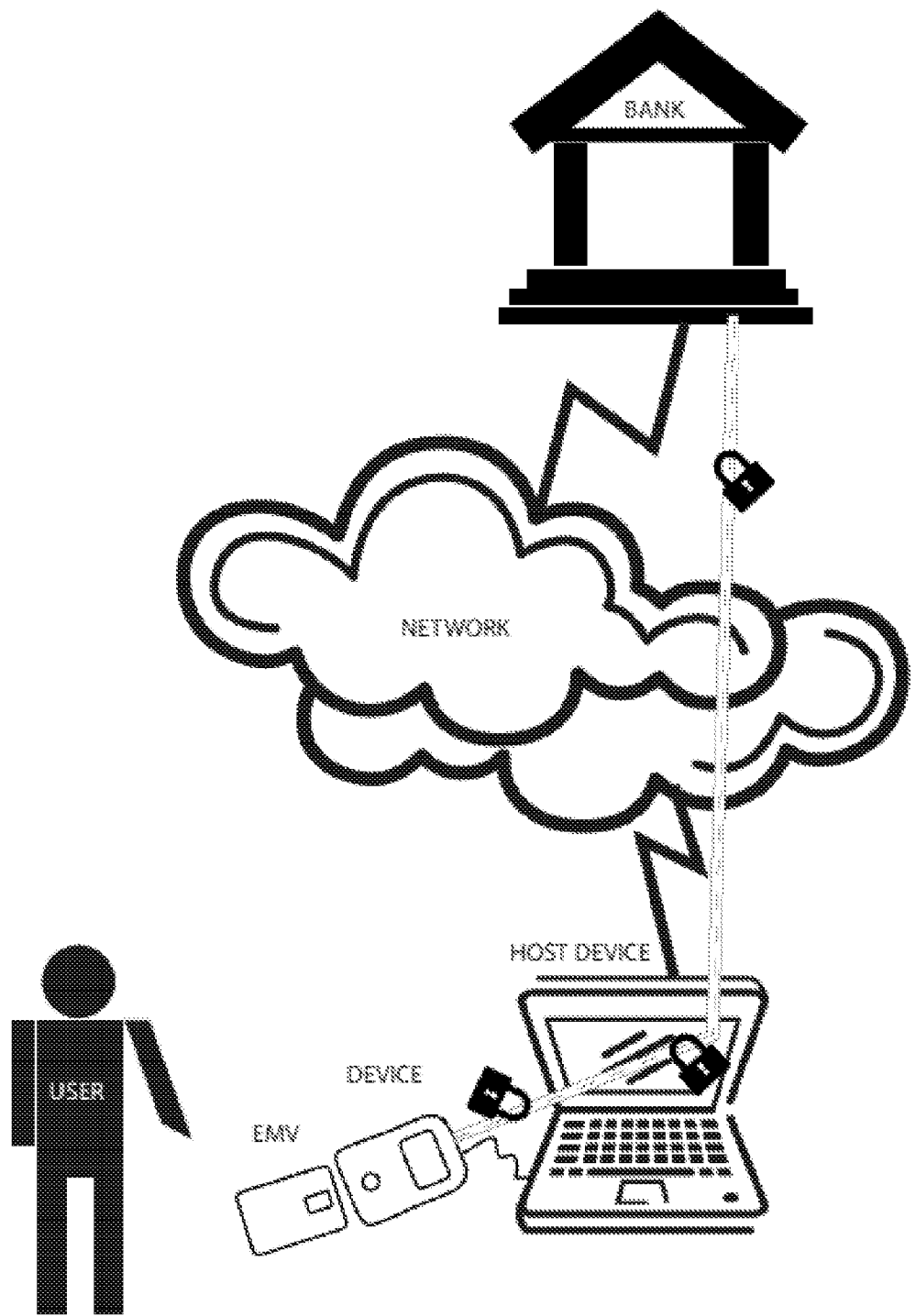
FIG. 9 shows a simplified view of a system of the invention used for logging in to online banking environment (directly)

FIG. 9 shows the method and system of logging into an online banking environment (directly) where the user wants to log in to the online banking environment provided by the bank. The user inserts his payment card issued by the bank into a device of the invention issued by the bank. The device is then connected to a host which might be a personal computer or other device. The device can optionally load software onto the host computer in an initialization phase once connected to the host computer. This software will initiate a tunnel for a secure connection to the issuing bank infrastructure. The connection is secured by encryption using pre stored keys stored internally on the device. The bank infrastructure will have a Hardware Security Module (HSM) with the matching keys for every issued unit and can then terminate the tunnel and decrypt the data coming from the device.

When the secure tunnel to the bank infrastructure is established, the device will send a command to the software running on the "host computer" to launch a secure browser that communicates with the bank infrastructure through the secure tunnel created by the device. A request for a resource at the bank system by the secure browser will first travel trough the connection to the device, then be relayed trough the encrypted tunnel by the device, running back through the connection to the host computer (with the difference that now the communication is encrypted), onto the internet and finally reach its destination at the bank infrastructure.

The device will receive an unpredictable number, a salt, from the bank infrastructure. This number will be used to perform a CAP or EMV transaction on the card that the user inserted. The user will be asked for his PIN. An Authorization Request Cryptogram, ARQC, will be generated by the card and transmitted to the bank infrastructure trough the tunnel. The bank infrastructure can then validate the ARQC to ensure that the card is authentic and that the data was not copied from a skimmed card and that the PIN was entered successfully. If this process succeeds the user is logged in to the online bank. If the login process is unsuccessful the communication attempt enters into an error state.

Figure 10:
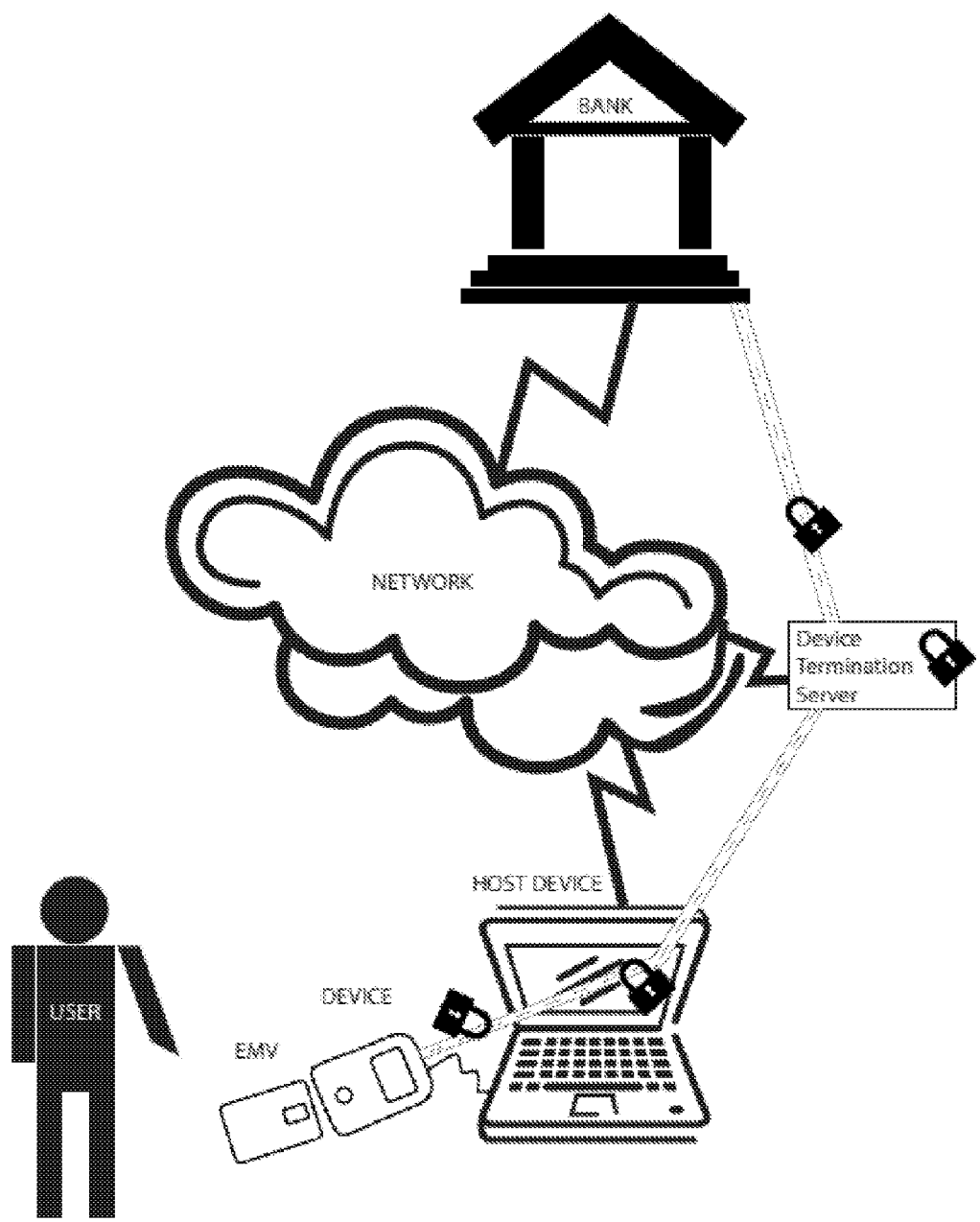
FIG. 10 shows a simplified view of a system of the invention used for logging in to online banking environment (trough third party)

FIG. 10 explains the method and system of the user logging in to online banking environment, where a third party acts as key manager. This works as described in FIG. 9 apart from key management. If the bank does not want to have to manage the keys for the issued devices of the invention, this responsibility could be relayed to a trusted third party that aggregates the connections from the devices into a single encrypted tunnel to the bank.

Figure 11:
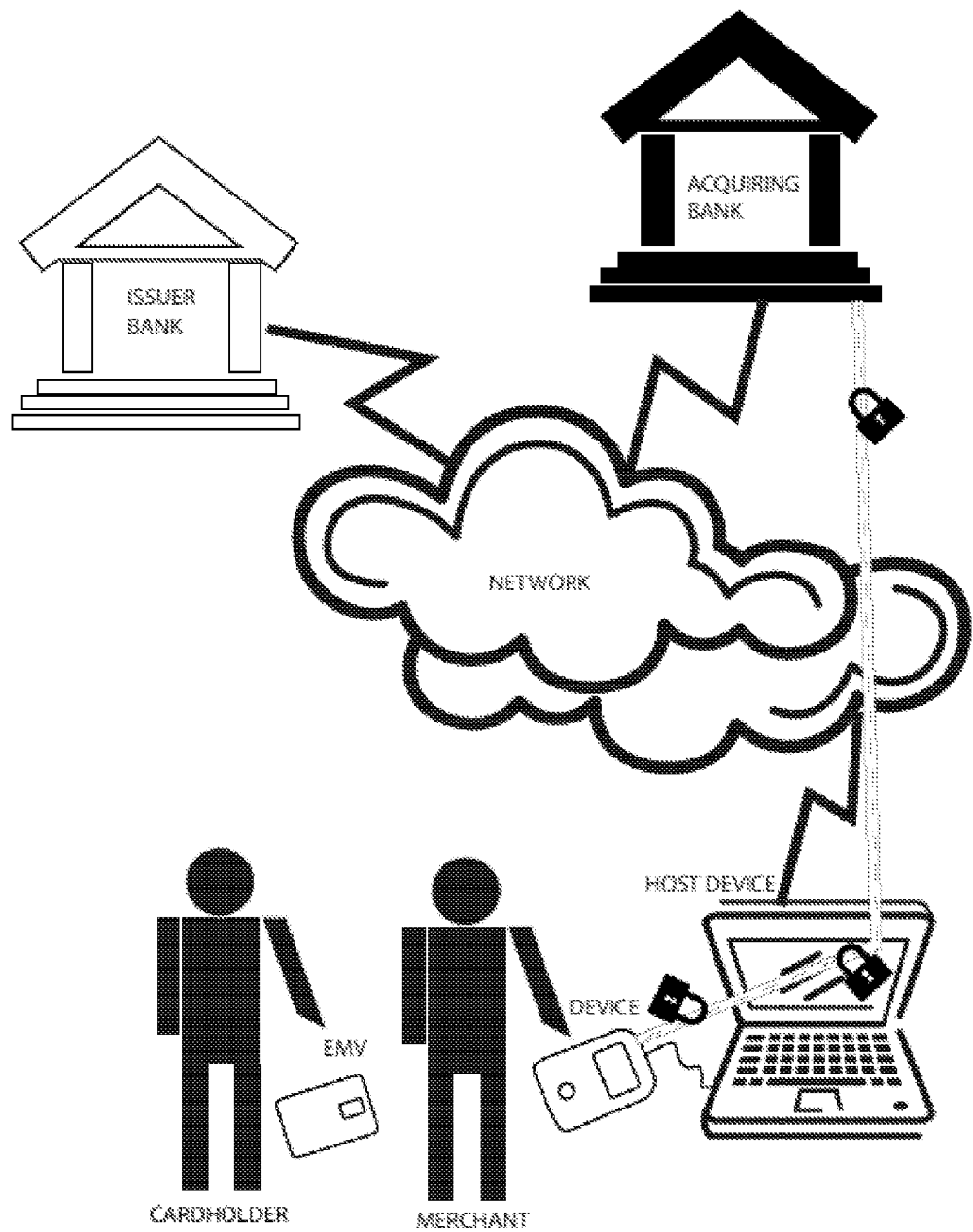
FIG. 11 shows a simplified view of a system of the invention used to pay with card to device owner (one device)

FIG. 11 shows the method and system where a cardholder wants to pay with his card to a device owner (one device).

The user that is issued a card and device from a bank (identified as merchant or receiver in figure) wants to receive a payment from cardholder (identified as the customer or sender in the figure). The merchant prepares the transaction on his "host device/computer". The customer inserts his payment card into the device issued by the merchant's bank, and a normal card transaction is carried out. E.g. the device will establish a secure tunnel to an endpoint at the acquiring bank that is connected to the payment card scheme that will accept the type of card that the customer has. An online EMV transaction is performed. The cardholder will be prompted to enter PIN or sign the transaction on the screen of the device. The issuing bank will accept the transaction. The issuing and acquiring bank will verify and settle all aggregated transactions between them after a given time.

Figure 12:
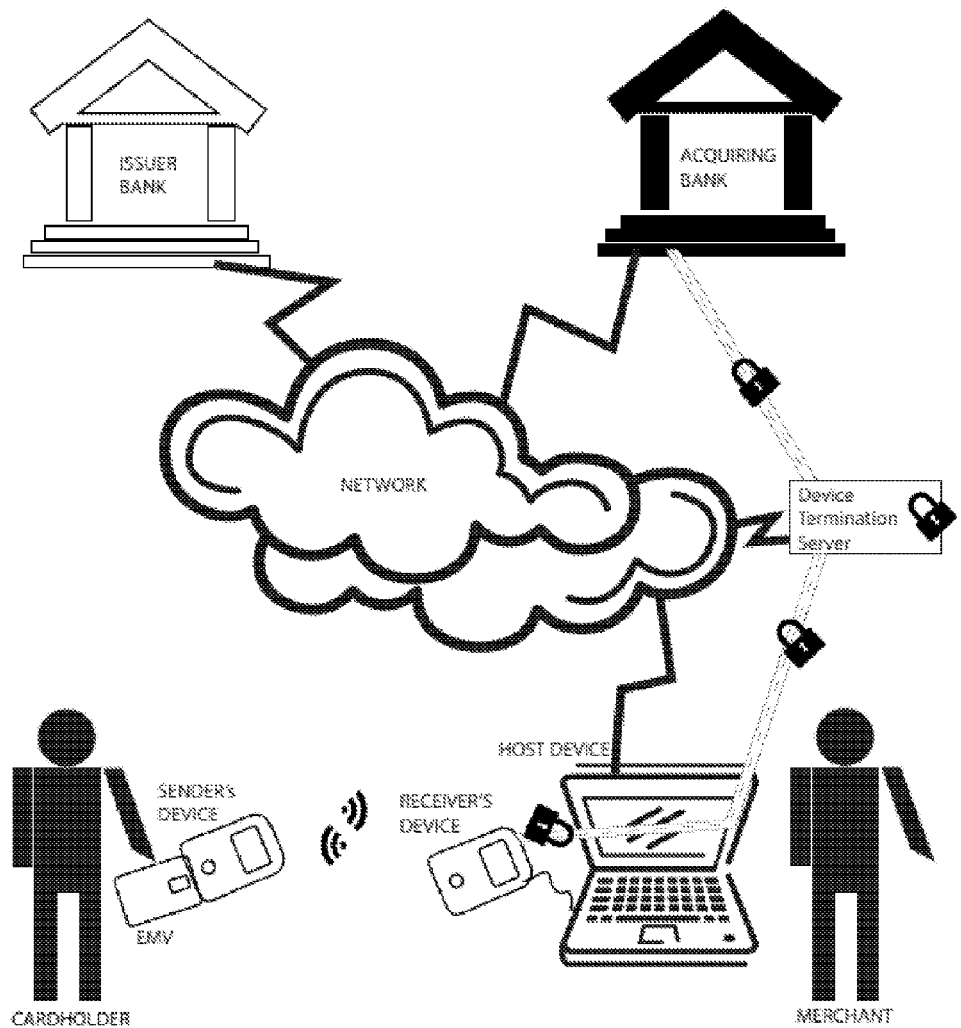
FIG. 12 shows a simplified view of a system of the invention used to pay with card to device owner (two devices)

FIG. 12 shows a method and system where a cardholder can pay with his card to device owner where both parties use their own devices of the invention. This works as described in FIG. 11, with a difference regarding cardholder verification. If the cardholder has a compatible device of their own, they can insert their card into their own device and enter the PIN on their own personal device. The two devices will communicate over a contact-less link established by gently tapping the devices together after the merchant has prepared his device for payment. The cardholder can verify the merchant name, other payment details and enter PIN on his own personal device.

Figure 13:
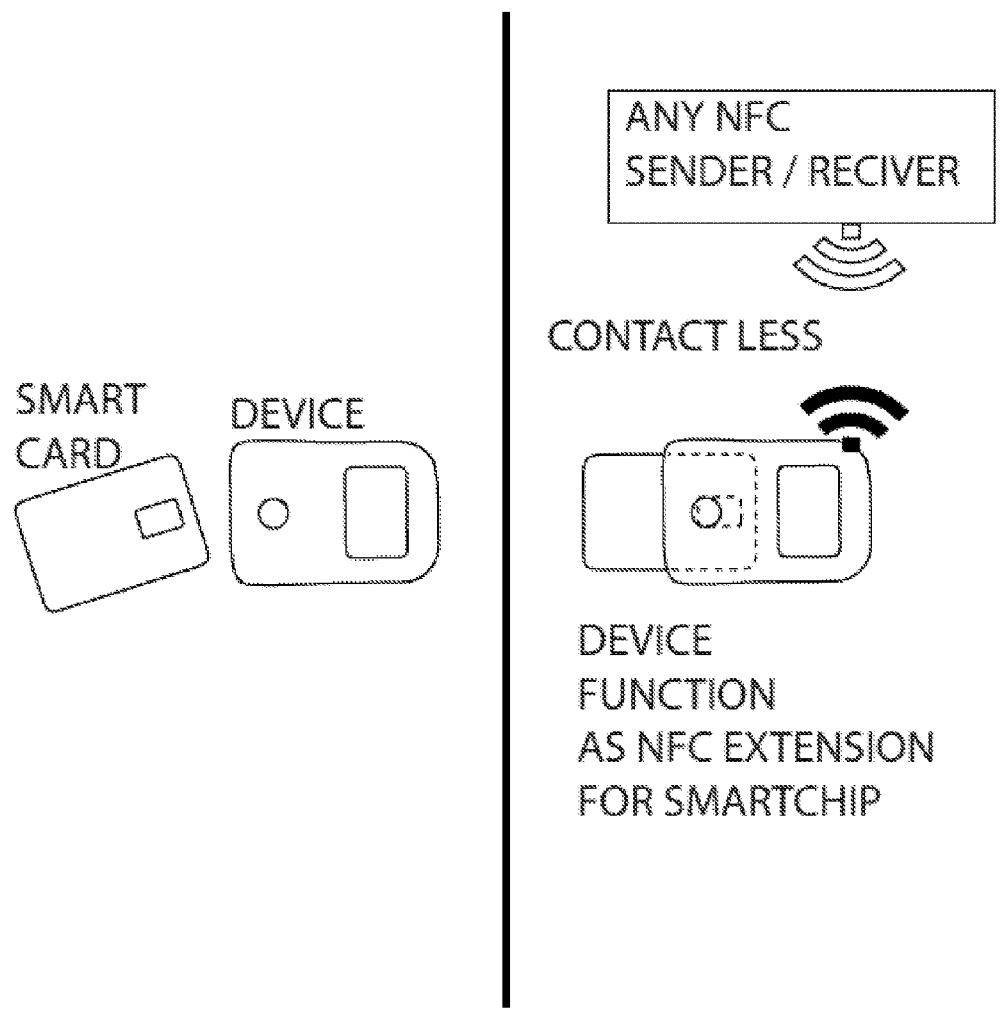
FIG. 13 shows a simplified view of a system of the invention used to make contact payment card into contactless card

The device of the invention comprises the ability to make a contact payment card into a contact-less card, which is exemplified in FIG. 13. A smart card is inserted into the device with a contact interface to the card and a contactless interface to the world. This enables the contact only card to function as a contactless card with any contactless, NFC reader. A secure element inside the device makes it possible to preload smart card applications onto the device and use it stand alone without a card to perform contactless transactions. This may be useful for loyalty programs and other applications that are based on physical contactless cards.

The associated figures of the different application areas and the explanations above illustrate that the invention device creates an encrypted tunnel to a device termination server, bypassing the host computer, and thus creates a much more secure channel for the transmission of personal card data including personal PIN codes that are commonly used to authenticate the card holder.

The device further enables that the user can have device issuer scripting performed on their personal device. This function enables an enhanced method for dialogue between the device issuer and the card holder. Depending on the graphical display on the device several graphical communication mechanisms may be utilized, e.g. QR, barcode etc.

For the bank applications the device functions as a personal payment terminal where no third party needs to know any of the card details.

Further features of the device may comprise applications that offer on board hardware encrypted storage. This function can be (un)locked by a smart card if activated.

The device of the invention is able to provide contact less and NFC functionality connected to internal secure element and card reader.

Optionally, the device of the invention comprises an on-screen touch keypad that can adapt into any language or symbols necessary, and further a graphical user interface that can display any characters or language.

The device of the invention can be remotely updated through an external secure connection with a trusted server utilizing end-to-end encryption and digitally signed files.

Further security features that may be optionally comprised in the device of the invention is device generated passwords, One Time Password (OTP) through any connectivity including but not limited to NFC, on-screen display w/OCR or 2D Barcode and USB.

The device of the invention comprises a fully functional computer environment offering several add on features that can be serviced with on board application software. Such applications are, but not limited to:
DEVICE to DEVICE payments offline transactions
DEVICE to function as smart card wallet
DEVICE to contain a portable operating system that can be used to start a personal computer or comparable device
DEVICE to function as physical access control device
DEVICE to function as software access device and digital ID
DEVICE to function as e-ticketing device
DEVICE to function as digital signature device
DEVICE to function towards 2 factor or more identification procedures/systems
DEVICE to provide encrypted storage, optionally secured by smartcard.

The description above describes examples and principles of the invention. It shall however be regarded as illustrative embodiments not restricting the possibilities that the functions and features described can be combined in any combination also other than explicitly described. A person skilled in the art may combine features of the embodiments without departing from the scope of the invention as defined by the claims as follows.

The invention claimed is:

1. A method for validation of a transaction process for authentication of a user of a device and a smartcard, the device communicating with a backend service provider via a host computer, the method comprising:
   initiating a secure communication tunnel between the device and the backend service provider, the smartcard, using a salt received through the secure communication tunnel from the backend service provider and other session specific parameters, generating an identification of the smartcard that is known to the backend service provider, and sending the identification to the backend service provider through the secure communication tunnel thereby providing a secure channel for authentication of the user and the smart card to the backend service provider without relying on any smartcard information or user input revealed to the host computer;
   displaying, by the host computer, a form to be filled in with one or more transaction details;
   receiving, at the host computer, an input by a user to verify or input the one or more transaction details;
   sending, by the host computer, the form comprising the one or more transaction details residing on the host computer to the device;
   adding, by the device, additional transaction details residing only in one or more of the device and the smartcard to the form; and
   sending, from the device, the form comprising the one or more transaction details residing on the host computer and the additional transaction details residing only in one or more of the device and the smartcard, through the secure communication tunnel to the backend service provider.

2. The method of claim 1, wherein the one or more transaction details residing on the device comprise one or more of a user account number, a smartcard ID, a device ID, and a PIN code.

3. The method of claim 1, wherein an input device is provided on the device, and
one or more of the transaction details residing on the device is input by the user to the device during the transaction process.

4. The method of claim 3, wherein the authentication of the smartcard user comprises:
receiving a PIN code, input to the device on the input device,
sending the PIN code to the smartcard for verification, and
communicating a result of the verification back to the device.

5. The method of claim 1, wherein one or more of the transaction details residing on the device is pre-stored on the device or smartcard.

6. The method of claim 1, further comprising:
presenting, by the device, the form filled out by the user, on the device, enabling the user to abort the transaction when any discrepancies between user inputted values and the values filled into the form by the host computer are identified by the user.

7. The method of claim 1, further comprising:
downloading the form to be filled in from the device to the host computer.

8. A device configured to communicate with the backend service provider of claim 1 for providing a secure channel between a smartcard and the backend service provider, the device comprising:
an interface configured to connect to a host computer;
a display unit configured to communicate information between the user and the device; and
a smartcard interface configured to communicate with a smart card.

9. The device according to claim 8, further comprising:
an input device configured to receive data input to the device, the data comprising one or more characters.

10. The device according to claim 8, further comprising:
a microcontroller unit;
a memory unit; and
a power management unit.

11. The device according to claim 8, further comprising:
a preloaded program configured to cause a processor to create and operate a secure encrypted communication channel between the device and the backend service provider.

12. The device according to claim 8, where the device is configured to transmit a form received from the connected host computer through the secure encrypted channel to the backend service provider.

13. The device according to claim 8, where the device is configured to receive information from the user via the input device, and to merge the information in a form received from the host device, and further transmits the merged form and the information to the backend service provider through the secure encrypted channel.

14. A system for connecting one or more smartcards to a backend service provider, the system providing a secure channel between a device connected to a backend service provider via a host computer, the system comprising:
an interface configured to connect to a host computer;
a display unit configured to communicate information between the user and the device; and
a smartcard interface configured to communicate with a smart card,
wherein the system is configured to perform the method of claim 1.

* * * * *